(12) United States Patent
Wagner et al.

(10) Patent No.: US 11,807,093 B2
(45) Date of Patent: Nov. 7, 2023

(54) DRIVE ASSEMBLY FOR LAWN CARE VEHICLE

(71) Applicant: Husqvarna AB, Huskvarna (SE)

(72) Inventors: Mark Wagner, Harrisburg, NC (US);
Jake Bagwell, Huntersville, NC (US);
Scott Andermann, Charlotte, NC (US);
Hope Guzewicz, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 101 days.

(21) Appl. No.: 17/613,887

(22) PCT Filed: Oct. 19, 2020

(86) PCT No.: PCT/US2020/056308
§ 371 (c)(1),
(2) Date: Nov. 23, 2021

(87) PCT Pub. No.: WO2021/194553
PCT Pub. Date: Sep. 30, 2021

(65) Prior Publication Data
US 2022/0219529 A1    Jul. 14, 2022

Related U.S. Application Data

(60) Provisional application No. 62/994,082, filed on Mar. 24, 2020.

(51) Int. Cl.
*B60K 17/02*    (2006.01)
*B60K 7/00*     (2006.01)
(Continued)

(52) U.S. Cl.
CPC ............ *B60K 17/02* (2013.01); *B60K 7/0007* (2013.01); *A01D 34/69* (2013.01);
(Continued)

(58) Field of Classification Search
CPC .................. B60K 17/02; B60K 7/0007; B60K 2007/0038; A01D 34/69; A01D 2101/00;
(Continued)

(56) References Cited

U.S. PATENT DOCUMENTS 4,986,400 A    1/1991    Heller
5,477,935 A   12/1995    Chen
(Continued)

FOREIGN PATENT DOCUMENTS

CA    1253698 A    5/1989
CA    2200818 C   12/2000
(Continued)

OTHER PUBLICATIONS

International Search Report and Written Opinion for International Application No. PCT/US2020/056308 dated Jan. 22, 2021.

*Primary Examiner* — Erez Gurari
(74) *Attorney, Agent, or Firm* — Burr & Forman LLP (57) ABSTRACT

A drive assembly for a vehicle may selectively couple a motor of the vehicle to a mobility assembly of the vehicle. The drive assembly may include a worm gear assembly having a worm engaged with a worm gear. The worm may be operably coupled to the motor of the vehicle, and the worm gear may be selectively coupled to a shaft of the mobility assembly. The drive assembly may be configured to move between a first configuration and a second configuration. In response to the drive assembly being in the first configuration, the worm gear assembly and the shaft of the mobility assembly may be operably coupled, and the worm gear assembly may be configured to selectively transfer power from the motor to the mobility assembly to provide mobility to the vehicle. In response to the drive assembly being in a second configuration, the worm gear assembly and the shaft of the mobility assembly may be decoupled, (Continued)

and the worm gear assembly may be prevented from transferring the power from the motor to the mobility assembly.

21 Claims, 9 Drawing Sheets (51) Int. Cl.
    *A01D 34/69*     (2006.01)
    *A01D 101/00*     (2006.01)
(52) U.S. Cl.
    CPC .. *A01D 2101/00* (2013.01); *B60K 2007/0038* (2013.01); *B60Y 2200/223* (2013.01); *B60Y 2400/421* (2013.01); *B60Y 2400/702* (2013.01)
(58) Field of Classification Search
    CPC ........ B60Y 2200/223; B60Y 2400/421; B60Y 2400/702
    See application file for complete search history.

(56)     References Cited

U.S. PATENT DOCUMENTS

| | | | |
|---|---|---|---|
| 6,364,736 B1 | 4/2002 | Lee | |
| 6,475,109 B2 | 11/2002 | Blanchard | |
| 6,742,409 B2 * | 6/2004 | Blanchard | F16H 57/021 74/416 |
| 7,175,012 B2 | 2/2007 | Ruebusch et al. | |
| 7,513,347 B2 | 4/2009 | Cibien | |
| 7,665,589 B2 | 2/2010 | Blanchard | |
| 10,130,031 B2 | 11/2018 | Yoshimura et al. | |
| 11,297,764 B1 * | 4/2022 | Milich | A01D 34/008 |
| 2002/0178708 A1 | 12/2002 | Williams et al. | |
| 2006/0060017 A1 * | 3/2006 | Ruebusch | F16D 11/10 74/340 |
| 2010/0206680 A1 | 8/2010 | Hung | |
| 2011/0088362 A1 * | 4/2011 | Rosa | B60L 50/52 56/11.9 |
| 2016/0076625 A1 * | 3/2016 | Guiroult | F16H 63/067 474/8 |
| 2018/0297629 A1 * | 10/2018 | Wang | B62D 5/0448 |
| 2019/0082592 A1 * | 3/2019 | Berglund | A01D 34/71 |
| 2022/0408651 A1 * | 12/2022 | Yamazaki | A01D 34/81 |

FOREIGN PATENT DOCUMENTS

| | | |
|---|---|---|
| FR | 2704287 A1 | 10/1994 |
| KR | 20160013566 A | 2/2016 |
| WO | 2011151439 A1 | 12/2011 |

* cited by examiner

FIG. 9

DRIVE ASSEMBLY FOR LAWN CARE VEHICLE

BACKGROUND

Lawn care tasks are commonly performed using various tools and/or machines that are configured for the performance of corresponding specific tasks. Certain tasks, like grass cutting, are typically performed by lawn mowers. Lawn care vehicles themselves may have many different configurations to support the needs and budgets of consumers. Walk-behind lawn care vehicles are typically compact, have comparatively small engines and are relatively inexpensive. Meanwhile, at the other end of the spectrum, riding lawn care vehicles, such as lawn tractors, can be quite large. Riding lawn care vehicles can sometimes also be configured with various functional accessories (e.g., trailers, tillers and/or the like) in addition to grass cutting components. Riding lawn care vehicles provide the convenience of a riding vehicle as well as a typically larger cutting deck as compared to a walk-behind model.

Fuel costs and an increased awareness of pollution and other byproducts of fossil fuel have generated much interest in the development of cleaner energy sources. Battery powered vehicles have a potential for reducing dependence on fossil fuels. However, it should be appreciated that many new design considerations that were not issues previously may come into play when battery powered vehicles are employed.

BRIEF SUMMARY OF SOME EXAMPLES

Some example embodiments may provide for a drive assembly for a lawn care vehicle. In this regard, the drive assembly may be configured to accomplish a large gear reduction ratio in a compact space while also eliminating a need for a parking brake system on the lawn care vehicle. Furthermore, the drive assembly may be configured to move between a plurality of configurations which allows a mobility assembly of the lawn care vehicle to be manually pushed or towed or powered by an electric motor.

In one example embodiment, a lawn care vehicle is provided. The lawn care vehicle may include a motor; a mobility assembly to provide mobility to the lawn care vehicle; a working assembly operably coupled to the motor to perform a working function responsive at least in part to operation of the motor; and a drive assembly for selectively coupling the motor of the vehicle to the mobility assembly of the vehicle to provide mobility to the vehicle responsive at least in part to operation of the motor. The drive assembly may include a worm gear assembly having a worm engaged with a worm gear. The worm may be operably coupled to the motor of the vehicle, and the worm gear may be selectively coupled to a shaft of the mobility assembly. The drive assembly may be configured to move between a first configuration and a second configuration. In response to the drive assembly being in the first configuration, the worm gear assembly and the shaft of the mobility assembly may be operably coupled, and the worm gear assembly may be configured to selectively transfer power from the motor to the mobility assembly to provide mobility to the vehicle. In response to the drive assembly being in a second configuration, the worm gear assembly and the shaft of the mobility assembly may be decoupled, and the worm gear assembly may be prevented from transferring the power from the motor to the mobility assembly.

In another example embodiment, a drive assembly for a vehicle is provided. The drive assembly for the vehicle may selectively couple a motor of the vehicle to a mobility assembly of the vehicle to provide mobility to the vehicle responsive at least in part to operation of the motor. The drive assembly may include a worm gear assembly having a worm engaged with a worm gear. The worm may be operably coupled to the motor of the vehicle, and the worm gear may be selectively coupled to a shaft of the mobility assembly. The drive assembly may be configured to move between a first configuration and a second configuration. In response to the drive assembly being in the first configuration, the worm gear assembly and the shaft of the mobility assembly may be operably coupled, and the worm gear assembly may be configured to selectively transfer power from the motor to the mobility assembly to provide mobility to the vehicle. In response to the drive assembly being in a second configuration, the worm gear assembly and the shaft of the mobility assembly may be decoupled, and the worm gear assembly may be prevented from transferring the power from the motor to the mobility assembly.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may provide for a drive assembly for a vehicle such as a lawn care vehicle. As noted above, the drive assembly may accomplish a large gear reduction ratio in a compact space with minimal components while also eliminating a need for a parking brake system on the vehicle. Furthermore, the drive assembly may be configured to move between a plurality of configurations which allows a mobility assembly of the vehicle to be manually pushed or towed or powered by a motor.

Figure 1:
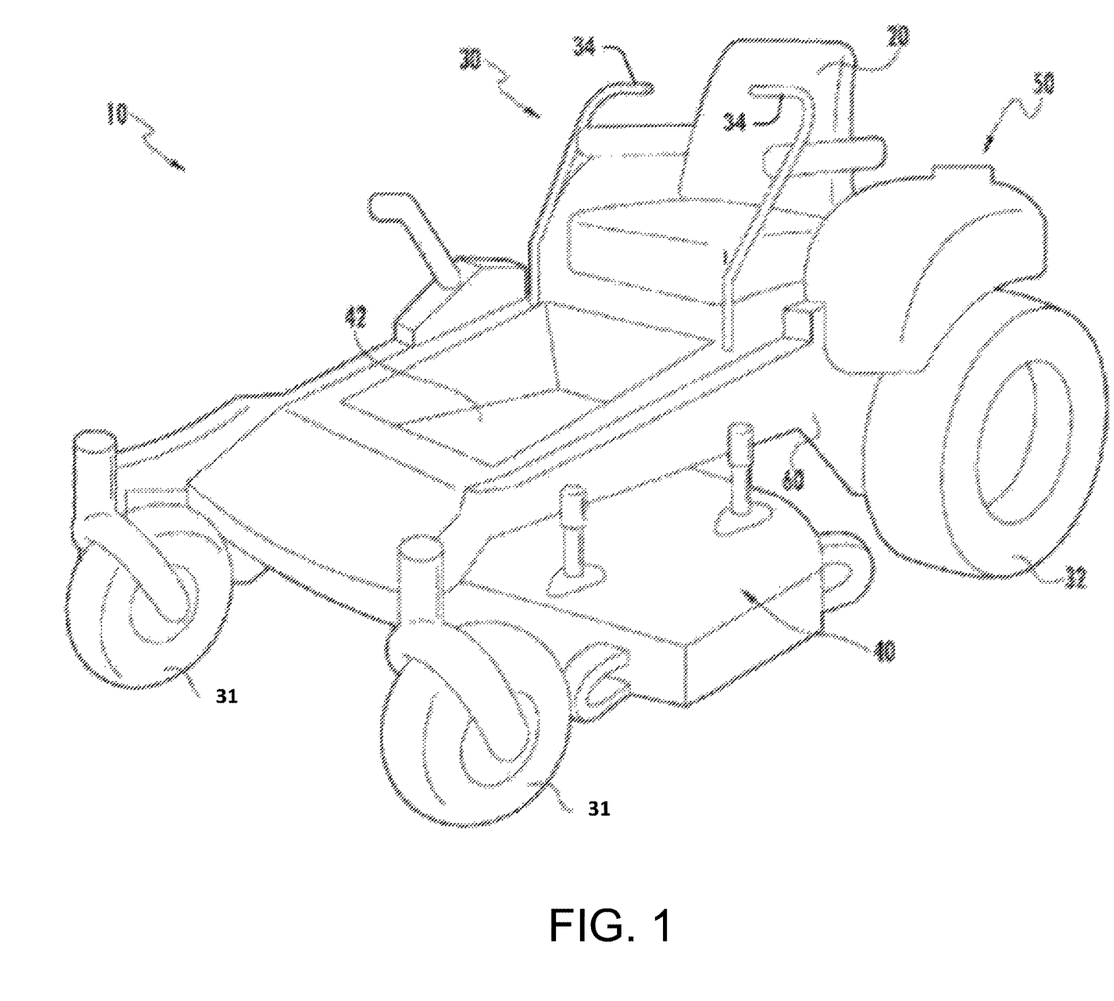
FIG. 1 illustrates a perspective view of a lawn care vehicle according to an example embodiment.
Figure 2:
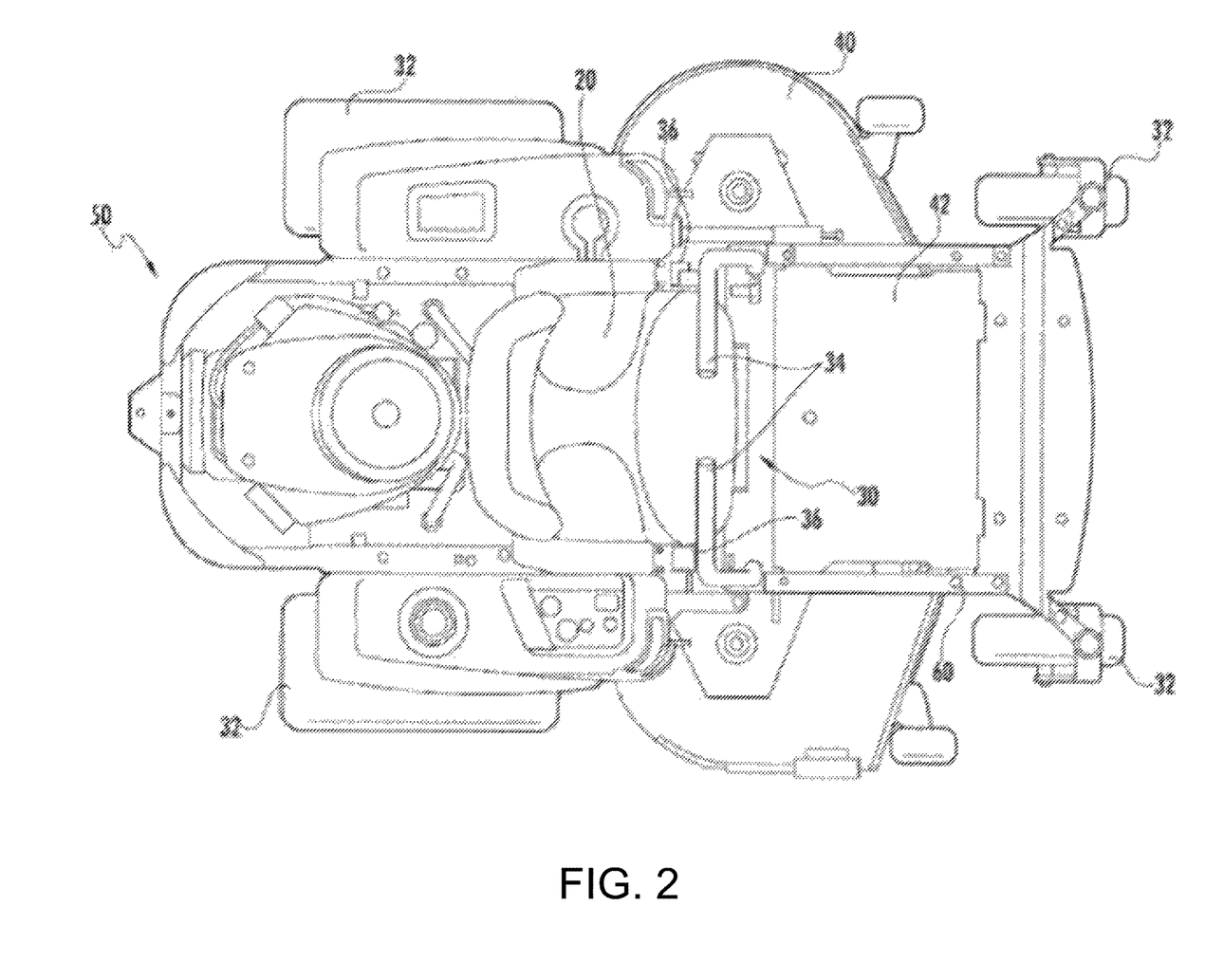
FIG. 2 illustrates a top view of the lawn care vehicle according to an example embodiment.
Figure 3:
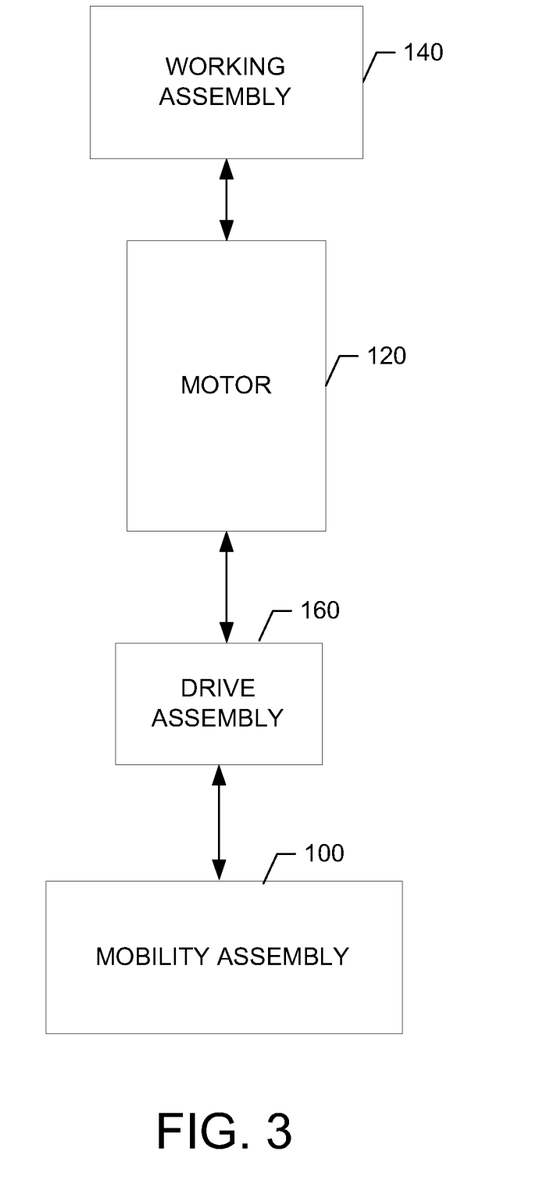
FIG. 3 illustrates a block diagram of the lawn care vehicle according to an example embodiment.

FIGS. 1-3 illustrate a riding lawn care vehicle 10 according to an example embodiment. FIG. 1 illustrates a perspective view of the riding lawn care vehicle 10 and FIG. 2 illustrates a top view of the riding lawn care vehicle 10 according to an example embodiment. Furthermore, FIG. 3 illustrates a block diagram of various components of the riding lawn care vehicle 10 to illustrate operable coupling provided between various of such components and to facilitate description of an example embodiment. While example embodiments described herein relate to a battery-powered riding lawn care vehicle, it should be understood that a drive assembly according to example embodiments herein may be employed on other vehicles. In this regard, in accordance with other example embodiments, the vehicle may be a gasoline-powered vehicle.

As shown in FIGS. 1 and 2, the riding lawn care vehicle 10 may include a seat 20 that may be disposed at a center, rear, or front portion of the riding lawn care vehicle 10. The riding lawn care vehicle 10 may also include a steering assembly 30 (e.g., a set of zero turn mower steering levers 34 with shaft 36 or the like) functionally connected to a mobility assembly 100 (e.g., wheels 31 and 32) of the riding lawn care vehicle 10 to allow the operator to steer the riding lawn care vehicle 10. For example, the operator may sit on the seat 20, which may be disposed to the rear of the steering assembly 30, to provide input for steering of the riding lawn care vehicle 10 via the steering assembly 30. However, some models may be stand-up models that eliminate the seat 20. If the seat 20 is eliminated, the operator typically stands at an operator station proximate to the steering assembly 30.

The steering assembly 30 may include steering levers 34 and a shaft 36. In some example embodiments, the steering assembly 30 may be embodied as an assembly of metallic or other rigid components that may be welded, bolted or otherwise attached to each other and operably coupled to the wheels 32 of the riding lawn care vehicle 10 to which steering inputs are provided. When a steering lever 34 is pushed forward (e.g., away from the operator towards the front of the vehicle), a corresponding wheel 31, 32 may move forward. When a steering lever 34 is pulled backward, the corresponding wheel 31, 32 may drive backward or rearward. Thus, when both steering levers 34 are pushed forward the same amount, the riding lawn care vehicle 10 may travel forward in substantially a straight line since approximately the same amount of forward drive input is provided to each drive wheel 31, 32. When both steering levers are pulled back the same amount, the riding lawn care vehicle 10 may travel backward in substantially a straight line since approximately the same amount of rearward drive input is provided to each drive wheel 31, 32. When one steering lever 34 is pushed forward and the other steering lever 34 is pulled back, the riding lawn care vehicle 10 may begin to turn in a circle. Steering right and left may be accomplished by providing uneven amounts of input to the steering levers 34. Other steering control systems may be employed in some alternative embodiments.

As noted above, the riding lawn care vehicle 10 may also include the mobility assembly 100. The mobility assembly 100 may include drivable components such as the wheels 31, 32 (e.g., a pair of rear wheels 32 being disposed at a rear of the riding lawn care vehicle 10 and a pair of front wheels 31 being disposed at a front of the riding lawn care vehicle 10). However, in accordance with other example embodiments, the drivable components may be continuous tracks or any other suitable component that may be powered to cause the riding lawn care vehicle 10 to move over a ground or surface. In an example embodiment, the rear wheels 32 may be provided on a drive or output shaft on opposing sides of the lawn care vehicle 10.

In the example embodiments of FIGS. 1 and 2, the riding lawn care vehicle 10 may also include a drive motor compartment 50. The drive motor compartment 50 may be disposed to the rear of the operator's seat 20 to house various components of the riding lawn care vehicle 10 including an electric drive motor 120. However, in other example embodiments, the drive motor compartment 50 could be in different positions such as in front of the seat 20 or below the seat 20. It should be understood that in accordance with other example embodiments the motor referred to herein may be a hydraulic, air, or other types of motors known in the art.

In some embodiments, the electric drive motor 120 may be operably coupled to the mobility assembly 100 (e.g., the rear wheels 32) in order to provide drive power for the riding lawn care vehicle 10, as further described below. Although the electric drive motor 120 described herein relates to powering the rear wheels 32, in other alternative embodiments, the electric drive motor 120 may power all four wheels 31, 32 of the riding lawn care vehicle 10. Moreover, in some cases, the electric drive motor 120 may manually or automatically shift between powering either two wheels 31, 32 or all four wheels 31, 32 of the riding lawn care vehicle 10.

The riding lawn care vehicle 10 may also include a working assembly 140. The working assembly 140 may be operably coupled to the electric drive motor 120 to perform a working function responsive at least in part to operation of the electric drive motor 120. The working assembly 140 in this example embodiment may be a cutting deck 40 (see FIG. 1) having at least one cutting blade mounted therein. The cutting deck 40 may be positioned behind the front pair of wheels 31 in a position to enable the operator to cut grass using the cutting blade when the cutting blade is rotated below the cutting deck 40 when the cutting deck 40 is in a cutting position. However, in some alternative examples, the cutting deck 40 may be positioned in front of the front pair of wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may be the operator station from which a standing operator controls the riding lawn care vehicle 10. When operating to cut grass, the grass clippings may be captured by a collection system, mulched, or expelled from the cutting deck 40 via either a side discharge or a rear discharge. In accordance with other example embodiments, the working assembly 140 could perform working functions such as snow removal, edging, tilling and/or the like.

In embodiments, where the riding lawn care vehicle 10 is electric powered, the riding lawn care vehicle 10 may also include a battery power source (not shown). The battery power source may include one or more batteries that may provide power for all electrical components of the lawn care vehicle 10. In cases in which multiple batteries are combined to form the battery power source, the batteries may be distributed or located near one another. For example, three twelve volt batteries may be employed connected in series and their locations may be distributed throughout the riding lawn care vehicle 10.

In an example embodiment, the electric drive motor 120, the mobility assembly 100, the steering assembly 30, the working assembly 140, the seat 20, and other components of the riding lawn care vehicle 10 may be operably connected (directly or indirectly) to a frame 60 of the riding lawn care vehicle 10. In this regard, the frame 60 may be a rigid structure configured to provide support, connectivity, and interoperability functions for various ones of the components of the riding lawn care vehicle 10.

Figure 4:
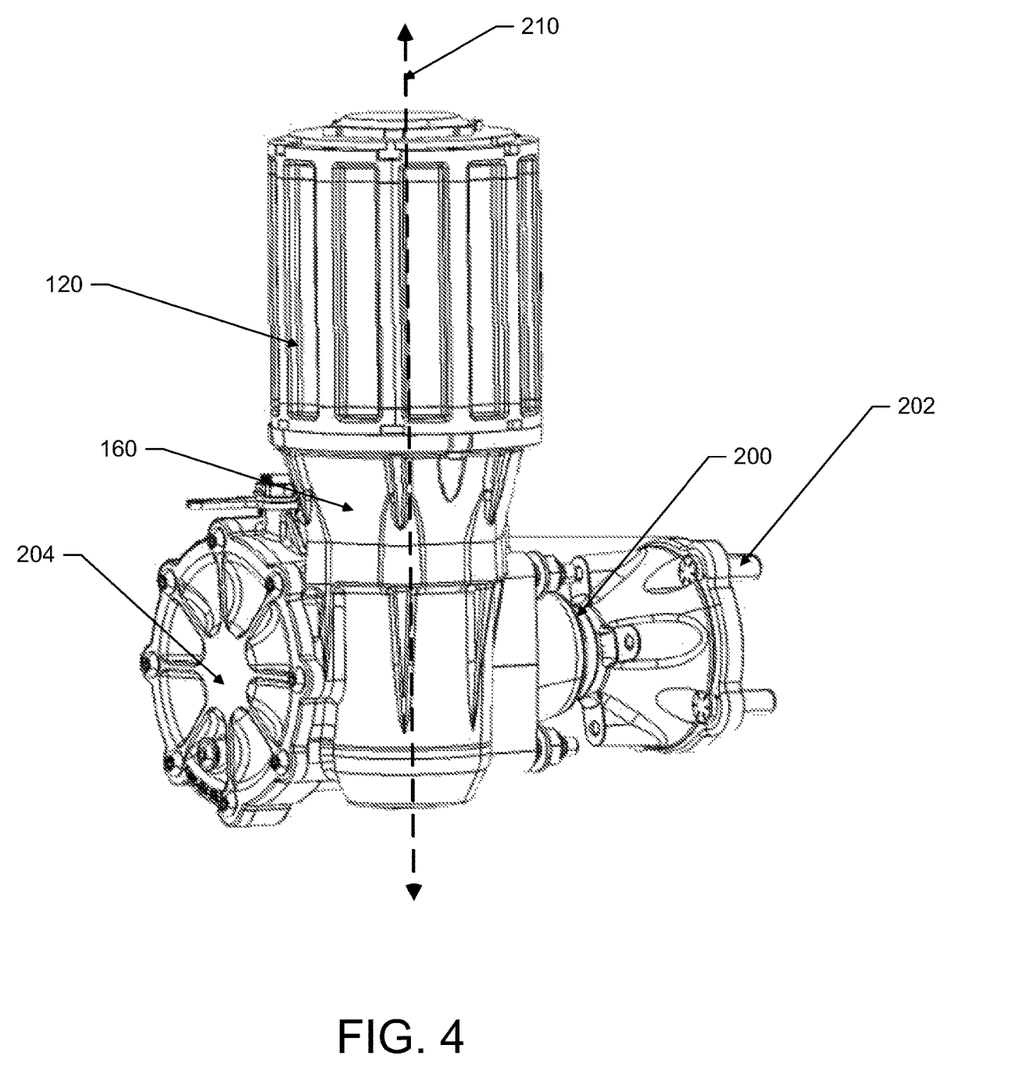
FIG. 4 illustrates a perspective view of a drive assembly of the lawn care vehicle according to an example embodiment.

As shown in FIGS. 3 and 4, the riding lawn care vehicle 10 may further include a drive assembly 160 to provide operable coupling between the motor 120 and the mobility assembly 100. FIG. 4 illustrates a perspective view of the drive assembly 160 in accordance with example embodiments. In this regard, the drive assembly 160 may transfer power from the motor 120 to the mobility assembly 100. The drive assembly 160 may be or include a transmission for transferring power from the motor 120 to the mobility assembly 100. As such, the drive assembly 160 may selectively provide forward drive power or reverse drive power to the mobility assembly 100. More specifically, the drive assembly 160 may transfer rotary power from the motor 120 through a series of gears, frictionally engaged components, and/or the like to the wheel 32 to turn the wheel 32 in a desired direction (i.e., forward or reverse).

The drive assembly 160 described herein may be configured to move between a first configuration and a second configuration. In this regard, the drive assembly 160 may be changeable from the first configuration where the drive assembly 160 is in an engaged position and the second configuration where the drive assembly 160 is in a disengaged position.

In the first configuration when the drive assembly 160 is in the engaged position, the motor 120 may selectively provide power to the mobility assembly 100 (i.e., wheel 32). In this regard, when the drive assembly 160 is in the first configuration, the drive assembly 160 is configured to selectively and independently provide power to the wheels 32 via the motor 120. Furthermore, when the drive assembly 160 is in the first configuration, the drive assembly 160 may be configured to prevent the mobility assembly 100 or wheels 32 from moving when no power is being transferred from the motor 120 to the mobility assembly 100 thereby eliminating the need for a parking brake system on the riding lawn care vehicle 10.

When the drive assembly 160 is in the second configuration, the drive assembly 160 may be in a disengaged position. When the drive assembly 160 is in the disengaged position, the motor 120 may be prevented from providing power to the mobility assembly 100, and the mobility assembly 100 is configured to move or rotate in response to the user or operator pushing or towing the lawn care vehicle 10. In other words, when the drive assembly 160 is in the first configuration, the riding lawn care vehicle 10 is prevented from moving, via the operator or user or otherwise, unless the motor 120 is providing the drive power to the mobility assembly 100 via the drive assembly 160. However, when the drive assembly 160 is in the second configuration, drive power from the motor 120 is prevented from being transferred to the mobility assembly 100 and rather the operator may manually push or tow the riding lawn care vehicle 10.

As noted above, the drive assembly 160 may be configured to receive input torque and rotational speed from the motor 120 for transferring to the mobility assembly 100 when the drive assembly 160 is in the first configuration (i.e., engaged position). In accordance with example embodiments, the motor 120 may be operably coupled or mounted directly to the drive assembly 160. Furthermore, components of the mobility assembly 100 (e.g., wheel mounting hub 202) may be operably coupled or mounted directly to the drive assembly 160 via an output or drive shaft 200. In this regard, a length of the output shaft 200 may extend through the drive assembly 160 substantially perpendicular to a longitudinal axis 210 of the of the motor 120. In this regard, a first end of the output shaft 200 may be disposed on a first side of the drive assembly 160 with a second, opposite end of the output shaft 200 being disposed on a second, opposite side of the drive assembly 160. FIG. 4 demonstrates the output shaft 200 having a wheel mounting hub 202 for one of the rear wheels 32 at the first end of the output shaft 20 with the second end of the output shaft 200 being capped off via cap 204 and thus controlling only one of the wheels 32. However, in accordance with other example embodiments, each of the first and the second end of the output shaft 200 may have corresponding wheel mounting hubs 202 for operably coupling each of the rear wheels 32. Thus, references to mobility assembly 100 may include one or both of rear wheels 32.

Figure 5:
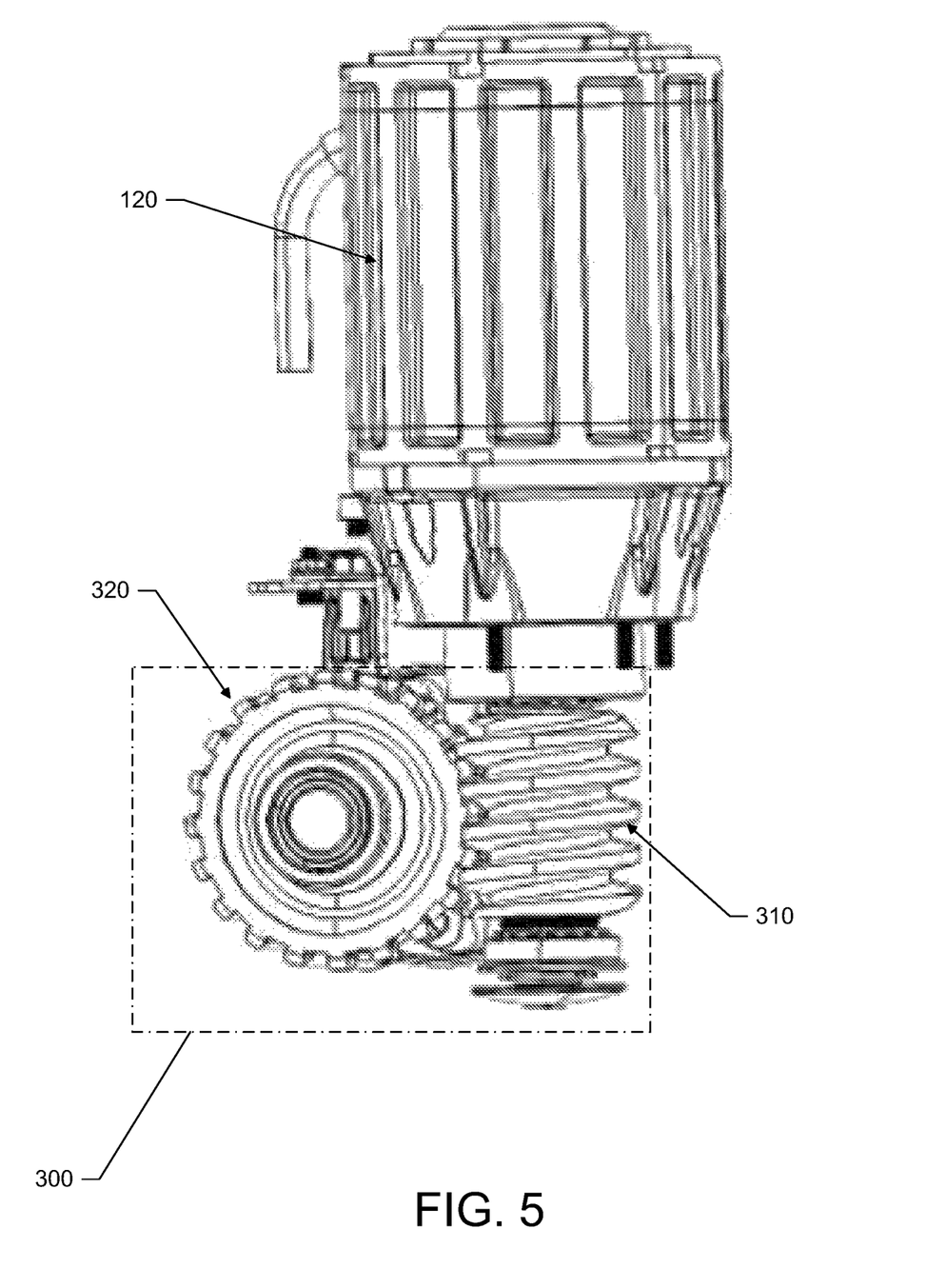
FIG. 5 illustrates a side view of the drive assembly of the lawn care vehicle with at least part of the housing and/or other components removed according to an example embodiment.
Figure 6:
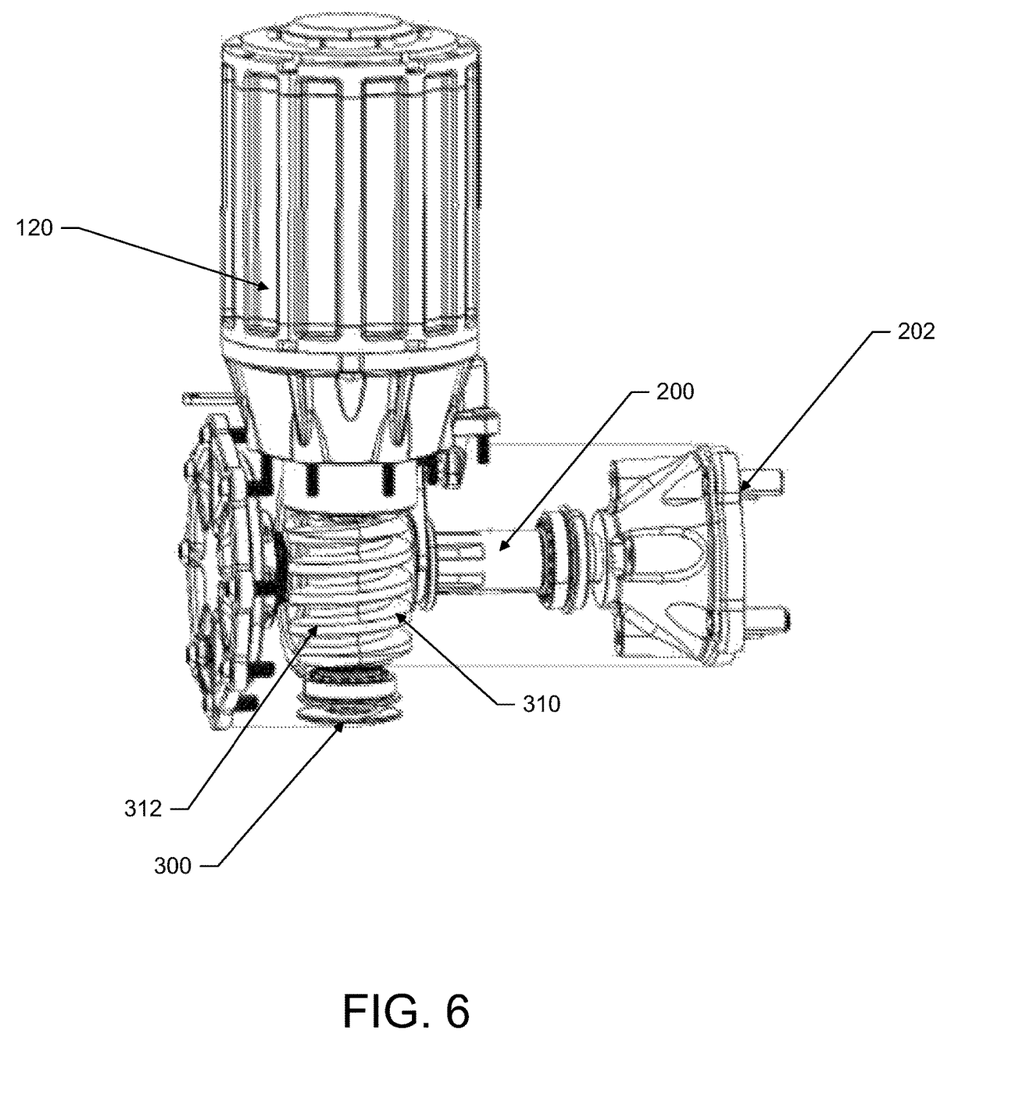
FIG. 6 illustrates a perspective view of a first side of the drive assembly of the lawn care vehicle with at least part of the housing and/or other components removed according to an example embodiment.
Figure 7:
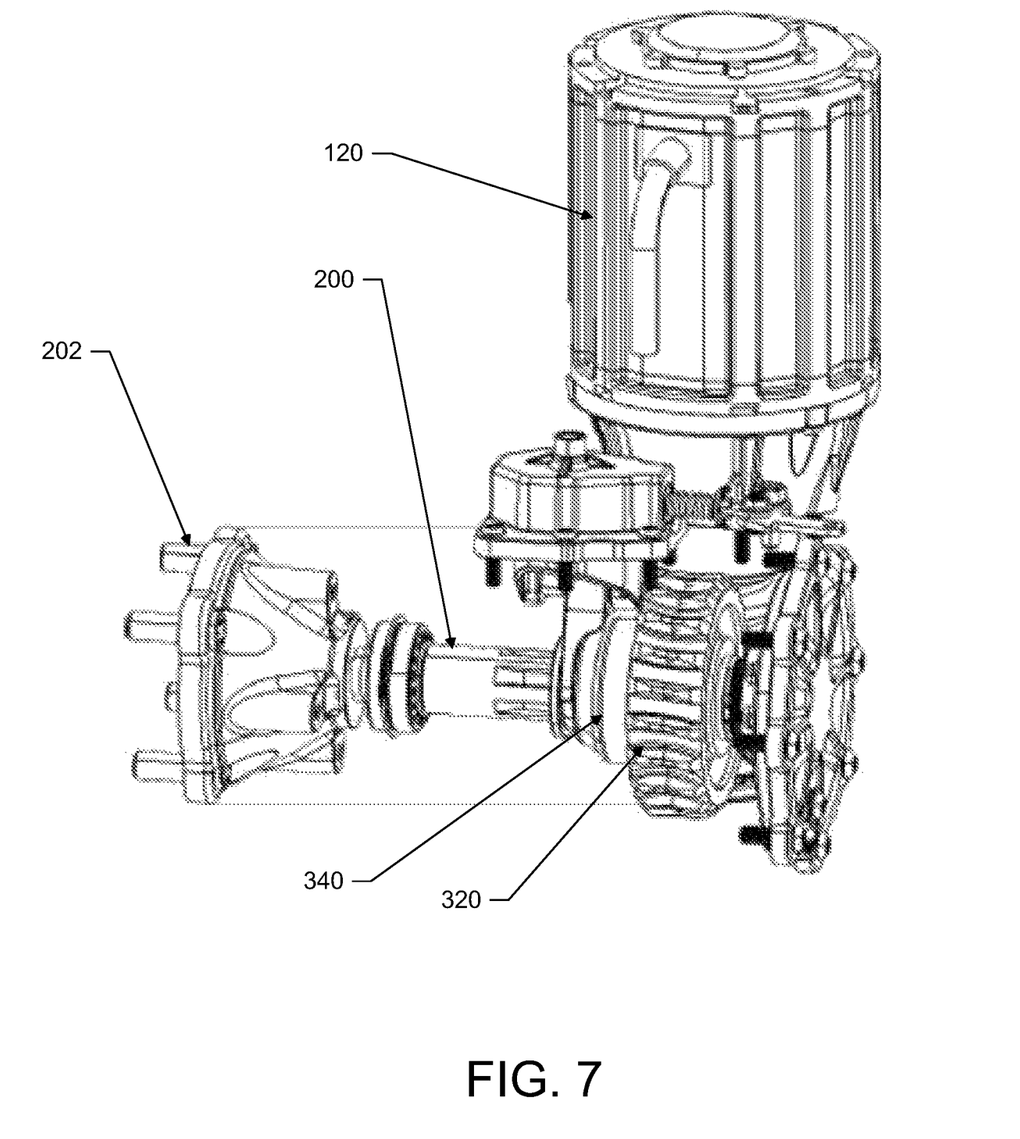
FIG. 7 illustrates a perspective view of a second side of the drive assembly of the lawn care vehicle with at least part of the housing and/or other components removed according to an example embodiment.

FIG. 5 illustrates a side view of the drive assembly 160 with a housing of the drive assembly 160 removed. FIG. 6 illustrates a perspective view of a first side of the drive assembly 160 with a housing of the drive assembly 160 removed, and FIG. 7 illustrate a perspective view of a second side of the drive assembly 160 with the housing of the driving assembly 160 removed. As shown in FIGS. 5-7, the drive assembly 160 may include a worm gear assembly 300 to facilitate the transfer of power from the motor 120 to the mobility assembly 100 when the drive assembly 160 is in the first configuration. In this regard, the worm gear assembly 300 may allow for single gear reduction from the motor 120 to the mobility assembly 100 to accomplish a large reduction ratio provided in the riding lawn care vehicle 100.

As shown in FIGS. 5-7, the worm gear assembly 300 may include a worm 310 and a worm gear 320. The worm 310 may be operably coupled to the motor 120. In particular, the motor 120 may selectively transfer rotational power to the worm 310 in order to facilitate rotation of the worm gear 320 by the worm 310 and thereby cause rotation of the output shaft 200 operably coupled to components of the mobility assembly 100. In this regard, when the drive assembly 160 is in the first configuration, the worm 310 and the worm gear 320 may be engaged. In this case, spherical threads 312 disposed on an exterior surface of the worm 310 may be configured to engage with and cause rotation of the worm gear 320 in response to the transfer of power from the motor 120. In response to rotation of the worm gear 320, the output shaft 200 may also rotate causing the rotational power to be transferred to respective components of the mobility assembly 100 (i.e., wheels 32). Because a single worm gear is being used to accomplish the large reduction ratio, the drive assembly 160 may be used in spaces where space is limited or compact.

Even in response to the motor 120 not transferring power to the worm 310 (e.g., motor is at zero RPM), engagement of the worm 310 and the worm gear 320 may prevent any back driving of the riding lawn care vehicle 10 when the drive assembly 160 is in the first configuration. In this regard, the worm 310 and the worm gear 320 may be self-locking in that the engagement of the worm 310 and the worm gear 320 prevents the worm gear 320 from driving the worm 310. Thus, the engagement of the worm 310 and the worm 320 effectively enables braking of the riding lawn care vehicle 10 without the need for the addition of a parking brake system.

The drive assembly 160 may also include an engagement assembly 340. As noted above, the drive assembly 160 is moveable between a first configuration (i.e., engaged position, FIGS. 7 and 8) and a second configuration (i.e., disengaged position, FIG. 9). To facilitate the drive assembly 160 moving between these configurations, the engagement assembly 340 may be provided. When the drive assembly 160 is in the first configuration, the engagement assembly 340 may be configured to lock or engage the worm gear assembly 300 to the output shaft 200 allowing the motor 120 to selectively provide power to the mobility assembly 100. However, as noted above, when the output shaft 200 is engaged or locked with the worm gear assembly 300, the output shaft 200 may be prevented from spinning freely, and thus due to the self-locking of the worm gear assembly 300, movement of the mobility assembly 100 may be prevented unless the motor 120 is providing rotational power to the mobility assembly 100 via the drive assembly 160.

Figure 9:
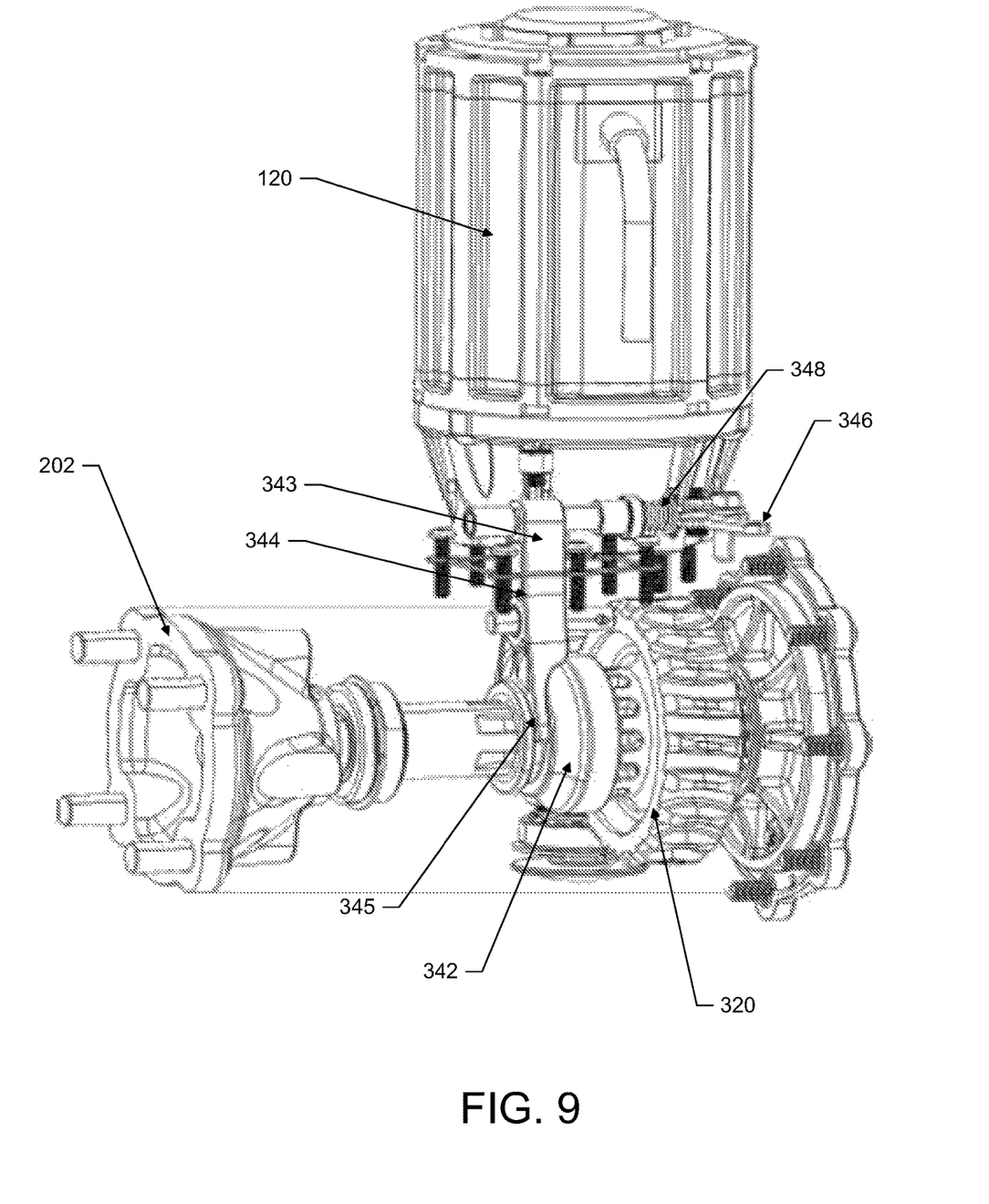
FIG. 9 illustrates a perspective view of the second side of the drive assembly of the lawn care vehicle with further parts of the housing and/or other components removed to illustrate the drive assembly being in a second configuration according to an example embodiment

The engagement assembly 340 may also be configured to unlock or disengage the worm gear assembly 300 from the output shaft 200. When the worm gear assembly 300 is unlocked from the output shaft 200 as shown in FIG. 9, the drive assembly 160 is in the second configuration (i.e., disengaged position). When the drive assembly 160 is in this second configuration, the output shaft 200 may freely spin or rotate (i.e., rotate independently) within the worm gear assembly 300. Thus, when the drive assembly 160 is in the second configuration, the drive assembly 160 is prevented from providing rotational power or braking to the mobility assembly 100 and thus the riding lawn care vehicle 10 may be moved in response to being pushed or towed.

Figure 8:
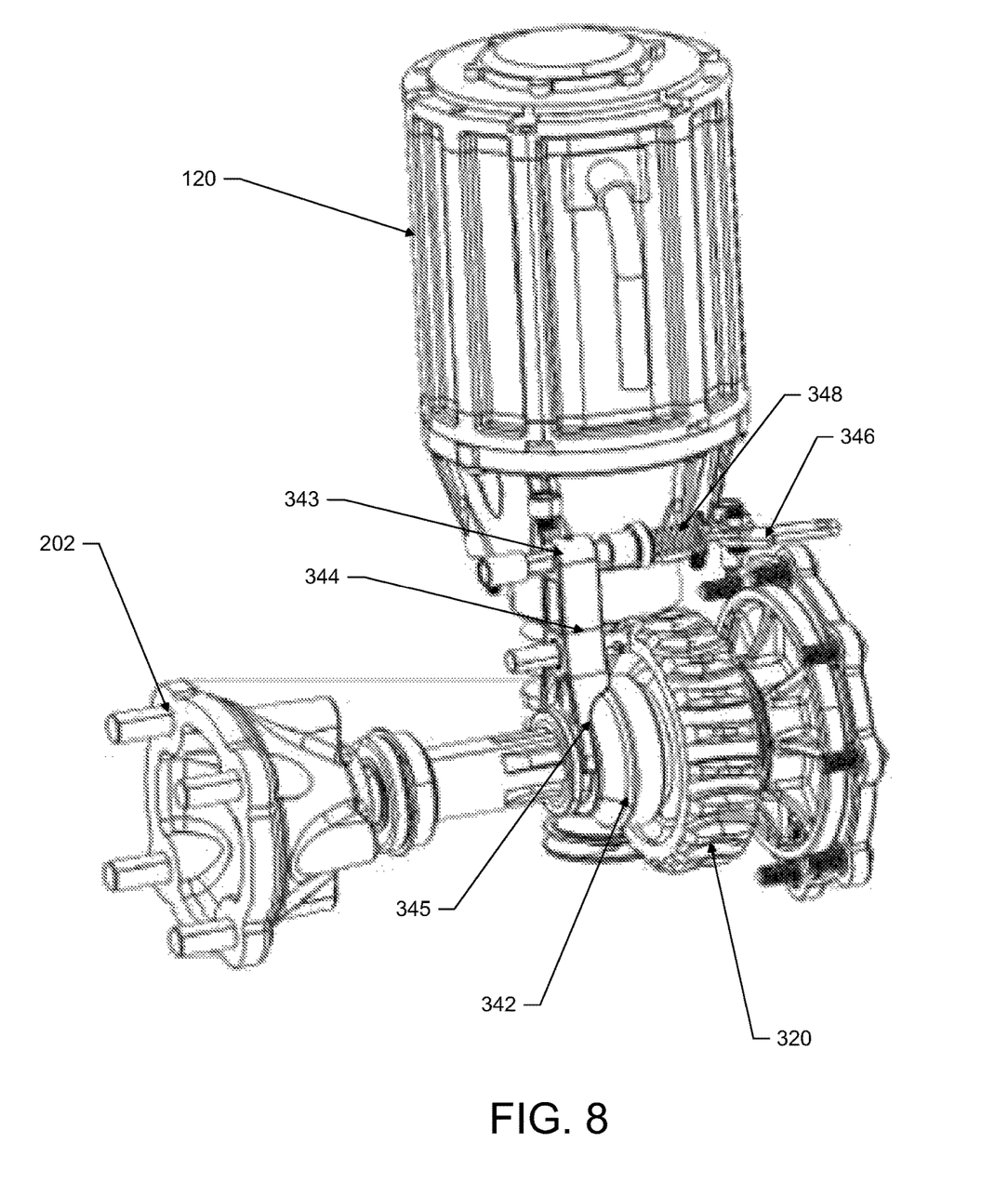
FIG. 8 illustrates a perspective view of the second side of the drive assembly of the lawn care vehicle with further parts of the housing and/or other components removed to illustrate the drive assembly being in a first configuration according to an example embodiment.

FIGS. 8 and 9 illustrate a perspective view of the drive assembly 160 with further components of the housing of the drive assembly 160 removed to illustrate the components of the engagement assembly 340. As shown in FIGS. 8 and 9, the engagement assembly 340 may include a dog clutch 342 and a selection lever 346. The selection lever 346 may be pivotable or rotatable between an engaged position (FIG. 8) and a disengaged position (FIG. 9) to cause the unlocking or locking of the worm gear assembly 300 with the output shaft 200. Furthermore, the position of the selection lever 346 may cause the engagement and disengagement of the dog clutch 342 with the worm gear assembly 300 to facilitate the unlocking or locking of the worm gear assembly 300 with the output shaft 200.

In this regard, when the drive assembly 160 is in a first configuration, the dog clutch 342 may be engaged with or operably coupled to a side of the worm gear 320 (position shown in FIG. 8), and when the drive assembly 160 is in the second configuration, the dog clutch 342 may be disengaged from the side of the worm gear 320 (position shown in FIG. 9). In this regard, the dog clutch 342 may move between positions in response to positioning of the selection lever 346. In other words, the position of the selection lever 346 may control the position of the dog clutch 342 relative to the worm gear 320 and thereby may cause the coupling of the worm gear assembly 300 to the output shaft 200.

When the selection lever 346 is in the engaged position (position shown in FIG. 8), the dog clutch 342 may be engaged with the worm gear 320 and the drive assembly 160 may be in the first configuration (i.e., the drive assembly 160 being configured to selectively transfer power from the motor 120 to the mobility assembly 100). When the selection lever 346 is in the disengaged position (position shown in FIG. 9), the dog clutch 342 may be disengaged with the worm gear 320 and the drive assembly 160 may be in the second configuration (i.e., the drive assembly 160 being prevented from transferring power from the motor 120 to the mobility assembly 100).

FIG. 8 illustrates the dog clutch 342 being operably coupled to the worm gear 320 and thus the drive assembly 160 being in the first configuration. To facilitate the operably coupling of the dog clutch 342 to the side of the worm gear 320, the engagement assembly 340 may also include a control fork 344. As shown in FIG. 8, the control fork 344 may enable or assist in the coupling of the dog clutch 342 with the worm gear 320. In this regard, the control fork 344 may be coupled at first end 343 to the selection lever 346 and at a second end 345 to the dog clutch 342. Thus, in response to movement of the selection lever 346 to the engaged position (shown in FIG. 8), the control fork 344 may hold the dog clutch 342 in engagement with the worm gear 320 and thus the drive assembly 160 may be in the first configuration. However, when the selection lever 346 moves to the disengaged position (e.g., to a position more proximate to the worm gear 320 shown in FIG. 9), the selection lever 346 may cause the shifting or movement of the control fork 344 toward the wheel mounting hub 202 and thus the dog clutch 342 out of engagement with the worm gear 320.

In some cases, as shown in FIGS. 8 and 9, the selection lever 346 may include a biasing mechanism 348. The biasing mechanism 348 may assist in urging or moving the control fork 344 (and thus the dog clutch 342) to a position in engagement with the worm gear 320 (see FIG. 8). In this regard, the biasing mechanism 348 may be operably coupled between the selection lever 346 and the first end 343 of the control fork 344 and may be operable to exert a biasing force on the control fork 344 to assist in urging the dog clutch 342 into engagement with the worm gear 320. In an example embodiment, the biasing mechanism 123 may be a spring. In some cases, the spring may be a coiled spring. It should be understood, however, that in other example embodiments the biasing mechanism 348 may be configured to assist in urging the dog clutch 342 out of engagement with the worm gear 320.

In some cases, the selection lever 346 may be manually moved by a user/operator of the riding lawn care vehicle 10 between the engaged and disengaged position. However, in some cases, the selection lever 346 may be configured to move in response to a push of a button or other some mechanism disposed at a control panel of the riding lawn care vehicle 10.

Accordingly, example embodiments described herein may provide a drive assembly for a vehicle. The drive assembly may selectively couple a motor of the vehicle to a mobility assembly of the vehicle. The drive assembly may include a worm gear assembly having a worm engaged with a worm gear. The worm may be operably coupled to the motor of the vehicle, and the worm gear may be selectively coupled to a shaft of the mobility assembly. The drive assembly may be configured to move between a first configuration and a second configuration. In response to the drive assembly being in the first configuration, the worm gear assembly and the shaft of the mobility assembly may be operably coupled, and the worm gear assembly may be configured to selectively transfer power from the motor to the mobility assembly to provide mobility to the vehicle. In response to the drive assembly being in a second configuration, the worm gear assembly and the shaft of the mobility assembly may be decoupled, and the worm gear assembly may be prevented from transferring the power from the motor to the mobility assembly.

In some embodiments, additional optional structures or features may be included or the structures/features described above may be modified or augmented. Each of the additional features, structures, modifications, or augmentations may be practiced in combination with the structures/features above or in combination with each other. Thus, some, all or none of the additional features, structures, modifications, or augmentations may be utilized in some embodiments. Some example additional optional features, structures, modifications, or augmentations are described below, and may include, for example, that in response to the drive assembly being in the first configuration, the worm gear assembly may be further configured to prevent any mobility of the mobility assembly of the vehicle in response to no power being transferred from the motor. Alternatively or additionally, the drive assembly may further include an engagement assembly configured to be selectively engaged with the worm gear assembly, and the drive assembly may be movable from the first configuration to the second configuration in response to disengagement of the engagement assembly from the worm gear assembly. Alternatively or additionally, the engagement assembly may include a selection lever configured to rotate between an engaged position and a disengaged position, and the engaged position may correspond to the first configuration of the drive assembly and the disengaged position may correspond to the second configuration of the drive assembly. Alternatively or additionally, the engagement assembly may include a dog clutch. In response to the selection lever being in the engaged position, the dog clutch may be configured to engage the worm gear assembly thereby operably coupling the worm gear assembly to the shaft of the mobility assembly. In response to the selection lever being in the disengaged position, the dog clutch may be configured to be disengaged from the worm gear assembly, and the worm gear assembly may be decoupled from the shaft of the mobility assembly. Alternatively or additionally, the dog clutch may be configured to engage a side of the worm gear in response to the selection lever being in the engaged position. Alternatively or additionally, the engagement assembly may include a control fork. A first end of the control fork may be operably coupled to the selection lever, and a second end of the control fork may be operably coupled to the dog clutch. The control fork may enable the engagement of the dog clutch to the worm gear assembly in response to the selection lever being in the engaged position. Alternatively or additionally, in response to the selection lever moving to the disengaged position, the control fork may be configured to move to a position away from the worm gear assembly thereby causing the dog clutch to disengage from the worm gear assembly. Alternatively or additionally, the selection lever may include a biasing mechanism, and the biasing mechanism may be configured bias the control fork to a position toward the worm gear assembly in response to the selection lever moving to the engaged position. Alternatively or additionally, the vehicle may be a lawn care vehicle. Alternatively or additionally, the lawn care vehicle may be a battery-powered lawn care vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A drive assembly for a vehicle, the drive assembly selectively coupling a motor of the vehicle to a mobility assembly of the vehicle to provide mobility to the vehicle responsive at least in part to operation of the motor, the drive assembly comprising:
   a worm gear assembly comprising a worm engaged with a worm gear, the worm being operably coupled to the motor of the vehicle and the worm gear being selectively coupled to a shaft of the mobility assembly; and
   an engagement assembly comprising a dog clutch configured to selectively engage and disengage the worm gear;
   wherein the drive assembly is configured to move between a first configuration and a second configuration, wherein in response to the drive assembly being in the first configuration, the dog clutch is engaged with the worm gear, and wherein the worm gear assembly and the shaft of the mobility assembly are operably coupled via the dog clutch and the worm gear assembly is configured to selectively transfer power from the motor to the mobility assembly to provide mobility to the vehicle,
   wherein in response to the drive assembly being in a second configuration, the dog clutch is disengaged from the worm gear, and wherein the worm gear assembly and the shaft of the mobility assembly are decoupled and the worm gear assembly is prevented from transferring the power from the motor to the mobility assembly.

2. The drive assembly of claim 1, wherein in response to the drive assembly being in the first configuration, the worm gear assembly is further configured to prevent any mobility of the mobility assembly of the vehicle in response to no power being transferred from the motor.

3. The drive assembly of claim 1, wherein the drive assembly is movable from the first configuration to the second configuration in response to disengagement of the engagement assembly from the worm gear assembly.

4. The drive assembly of claim 3, wherein the engagement assembly comprises a selection lever configured to rotate between an engaged position and a disengaged position, and wherein the engaged position corresponds to the first configuration of the drive assembly and the disengaged position corresponds to the second configuration of the drive assembly.

5. The drive assembly of claim 4, wherein in response to the selection lever being in the engaged position, the dog clutch is configured to engage the worm gear thereby operably coupling the worm gear assembly to the shaft of the mobility assembly, and wherein in response to the selection lever being in the disengaged position, the dog clutch is configured to be disengaged from the worm gear and the worm gear assembly is decoupled from the shaft of the mobility assembly.

6. The drive assembly of claim 5, wherein the dog clutch is configured to engage a side of the worm gear in response to the selection lever being in the engaged position.

7. The drive assembly of claim 5, wherein the engagement assembly further comprises a control fork, wherein a first end of the control fork is operably coupled to the selection lever, and wherein a second end of the control fork is operably coupled to the dog clutch, wherein the control fork enables the engagement of the dog clutch to the worm gear assembly in response to the selection lever being in the engaged position.

8. The drive assembly of claim 7, wherein in response to the selection lever moving to the disengaged position, the control fork is configured to move to a position away from the worm gear assembly thereby causing the dog clutch to disengage from the worm gear assembly.

9. The drive assembly of claim 7, wherein the selection lever comprises a biasing mechanism, the biasing mechanism configured bias the control fork to a position toward the worm gear assembly in response to the selection lever moving to the engaged position.

10. The drive assembly of claim 1, wherein the vehicle is a lawn care vehicle.

11. The drive assembly of claim 10, wherein the lawn care vehicle is a battery-powered lawn care vehicle.

12. A lawn care vehicle comprising:
a motor;
a mobility assembly to provide mobility of the lawn care vehicle;
a working assembly operably coupled to the motor to perform a working function responsive at least in part to operation of the motor; and
a drive assembly selectively coupling the motor to the mobility assembly to provide the mobility to the lawn care vehicle responsive at least in part to operation of the motor, the drive assembly comprising a worm gear assembly comprising a worm engaged with a worm gear, the worm being operably coupled to the motor and the worm gear being selectively coupled to a shaft of the mobility assembly; and
an engagement assembly comprising a dog clutch configured to selectively engage and disengage the worm gear,
wherein the drive assembly is configured to move between a first configuration and a second configuration, wherein in response to the drive assembly being in the first configuration, the dog clutch is engaged with the worm gear, and wherein the worm gear assembly and the shaft of the mobility assembly are operably coupled via the dog clutch and the worm gear assembly is configured to selectively transfer power from the motor to the mobility assembly to provide mobility to the lawn care vehicle,
wherein in response to the drive assembly being in a second configuration, the dog clutch is disengaged from the worm gear, and wherein the worm gear assembly and the shaft of the mobility assembly are decoupled and the worm gear assembly is prevented from transferring the power from the motor to the mobility assembly.

13. The lawn care vehicle of claim 12, wherein in response to the drive assembly being in the first configuration, the worm gear assembly is further configured to prevent any mobility of the mobility assembly in response to no power being transferred from the motor.

14. The lawn care vehicle of claim 12, wherein the drive assembly is movable from the first configuration to the second configuration in response to disengagement of the engagement assembly from the worm gear assembly.

15. The lawn care vehicle of claim 14, wherein the engagement assembly comprises a selection lever configured to rotate between an engaged position and a disengaged position, and wherein the engaged position corresponds to the first configuration of the drive assembly and the disengaged position corresponds to the second configuration of the drive assembly.

16. The lawn care vehicle of claim 15, wherein in response to the selection lever being in the engaged position, the dog clutch is configured to engage the worm gear thereby operably coupling the worm gear assembly to the shaft of the mobility assembly, and wherein in response to the selection lever being in the disengaged position, the dog clutch is configured to be disengaged from the worm gear the worm gear assembly is decoupled from the shaft of the mobility assembly.

17. The lawn care vehicle of claim 16, wherein the dog clutch is configured to engage a side of the worm gear in response to the selection lever being in the engaged position.

18. The lawn care vehicle of claim 16, wherein the engagement assembly further comprises a control fork, wherein a first end of the control fork is operably coupled to the selection lever, and wherein a second end of the control fork is operably coupled to the dog clutch, wherein the control fork enables the engagement of the dog clutch to the worm gear assembly in response to the selection lever being in the engaged position.

19. The lawn care vehicle of claim 18, wherein in response to the selection lever moving to the disengaged position, the control fork is configured to move to a position away from the worm gear assembly thereby causing the dog clutch to disengage from the worm gear assembly.

20. The lawn care vehicle of claim 18, wherein the selection lever comprises a biasing mechanism, the biasing mechanism configured to bias the control fork to a position toward the worm gear assembly in response to the selection lever moving to the engaged position.

21. A drive assembly for a vehicle, the drive assembly selectively coupling a motor of the vehicle to a mobility assembly of the vehicle to provide mobility to the vehicle responsive at least in part to operation of the motor, the drive assembly comprising:
- (i) a worm gear assembly comprising a worm engaged with a worm gear, the worm being operably coupled to the motor and the worm gear being selectively coupled to a shaft of the mobility assembly;

wherein the drive assembly is configured to move between a first configuration and a second configuration, wherein in response to the drive assembly being in the first configuration, the worm gear assembly and the shaft of the mobility assembly are operably coupled and the worm gear assembly is configured to selectively transfer power from the motor to the mobility assembly to provide mobility to the lawn care vehicle, wherein in response to the drive assembly being in a second configuration, the worm gear assembly and the shaft of the mobility assembly are decoupled and the worm gear assembly is prevented from transferring the power from the motor to the mobility assembly,

- (ii) an engagement assembly configured to be selectively engaged with the worm gear assembly, wherein the drive assembly is movable from the first configuration to the second configuration in response to disengagement of the engagement assembly from the worm gear assembly, wherein the engagement assembly comprises a selection lever configured to rotate between an engaged position and a disengaged position, and wherein the engaged position corresponds to the first configuration of the drive assembly and the disengaged position corresponds to the second configuration of the drive assembly, and wherein the engagement assembly further comprises a dog clutch, wherein in response to the selection lever being in the engaged position, the dog clutch is configured to engage the worm gear assembly thereby operably coupling the worm gear assembly to the shaft of the mobility assembly, and wherein in response to the selection lever being in the disengaged position, the dog clutch is configured to be disengaged from the worm gear assembly and the worm gear assembly is decoupled from the shaft of the mobility assembly.

* * * * *

UNITED STATES PATENT AND TRADEMARK OFFICE
CERTIFICATE OF CORRECTION

| | | |
|---|---|---|
| PATENT NO. | : 11,807,093 B2 | Page 1 of 1 |
| APPLICATION NO. | : 17/613887 | |
| DATED | : November 7, 2023 | |
| INVENTOR(S) | : Mark Wagner et al. | |

It is certified that error appears in the above-identified patent and that said Letters Patent is hereby corrected as shown below:

In the Claims

In Column 12, Claim 16, Lines 46-47, "the worm gear the worm gear assembly" should read --the worm gear and the worm gear assembly--

Signed and Sealed this
Thirteenth Day of February, 2024

Katherine Kelly Vidal
*Director of the United States Patent and Trademark Office*